March 28, 1939.  D. G. MERRILL  2,151,983
METHOD OF AND APPARATUS FOR DECORATING AND ANNEALING GLASSWARE
Filed Feb. 17, 1937  2 Sheets-Sheet 1
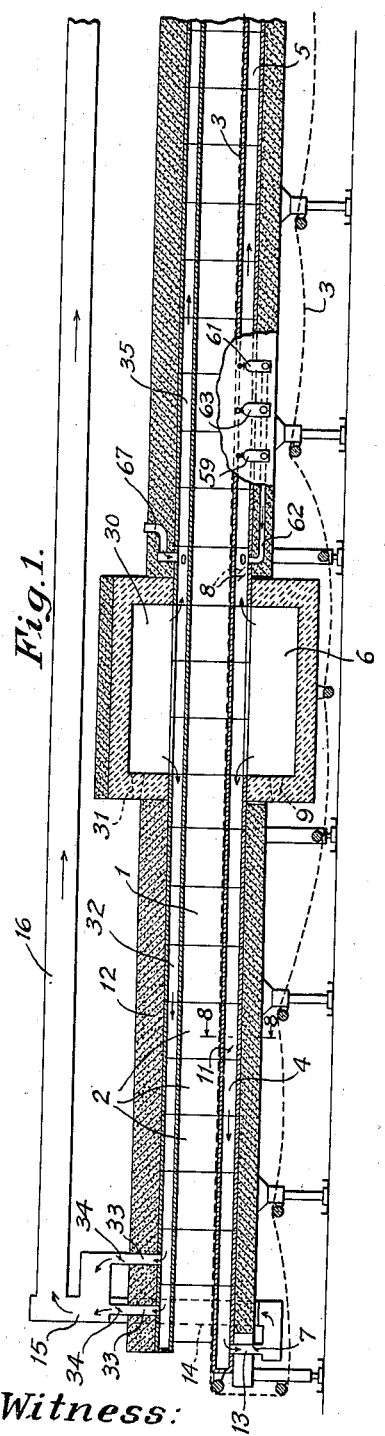
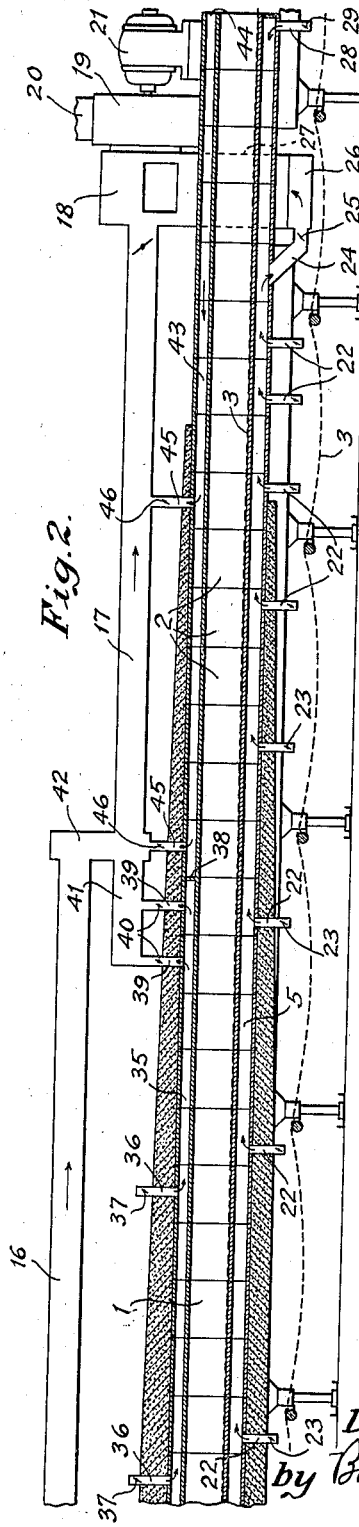
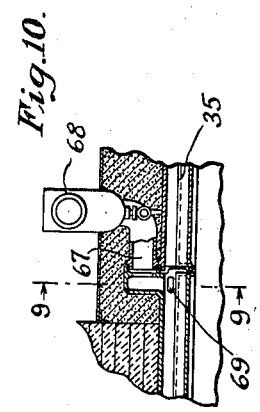
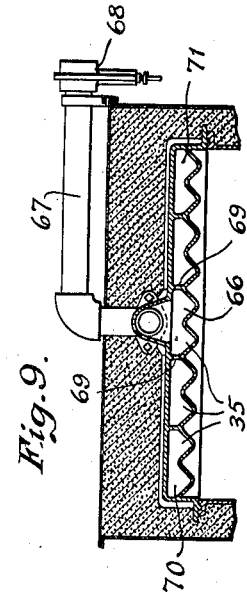
Inventor:
Donald G. Merrill
by Brown & Parham
Attorneys.
Witness:
A. A. Horn

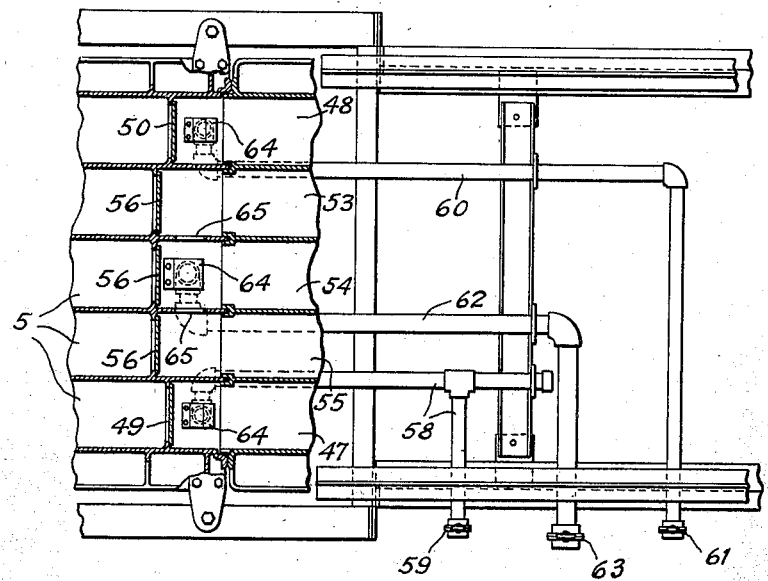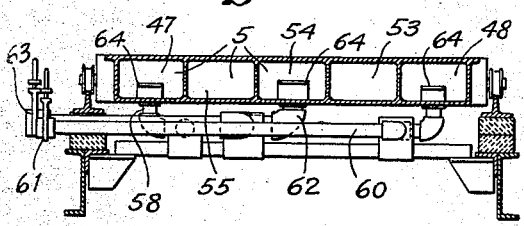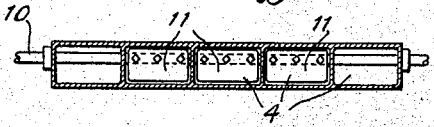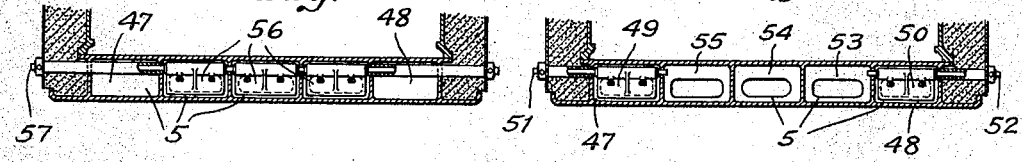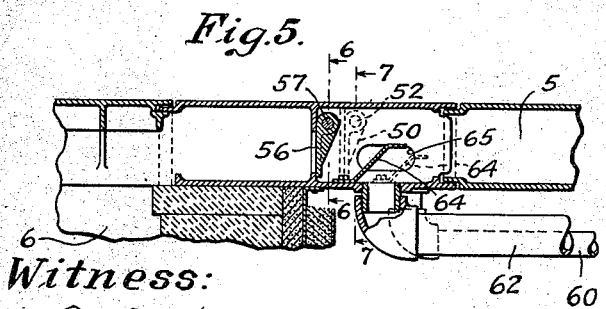

Patented Mar. 28, 1939

2,151,983

UNITED STATES PATENT OFFICE 2,151,983

METHOD OF AND APPARATUS FOR DECORATING AND ANNEALING GLASSWARE

Donald G. Merrill, West Hartford, Conn., assignor to Hartford-Empire Company, Hartford, Conn., a corporation of Delaware Application February 17, 1937, Serial No. 126,190

11 Claims. (Cl. 49—47)

This invention relates to a method of and apparatus for decorating and annealing glassware and is an improvement both as to method and apparatus upon the method and apparatus employed in the use of an earlier form of decorating lehrs made by the Hartford-Empire Company and disclosed in the patent to Mulholland, No. 1,798,552, granted March 31, 1931.

In decorating glassware, the ware is usually formed and annealed in the same manner as ware which is not to be decorated. After the ware has been cooled to room temperature, decorating material, usually of a ceramic nature dispersed in a liquid vehicle, is suitably placed on the articles, either automatically or by hand and according to a desired design. The ware is then passed through what is now known as a decorating lehr, which is the type of apparatus to which the present invention pertains.

The process of decorating in prior decorating lehrs, as shown for example in the Mulholland patent above referred to, includes the progressive heating of the ware from room temperature up to the desired high temperature at which the decorating material will fuse on the glass, then holding the ware at such a high temperature for a time sufficient to permit the complete fusing of the decorating material, then gradually reducing the temperature and carrying on again the normal annealing process according to substantially the same rules and with substantially the same temperature gradient as when the ware was originally annealed, the requirements for annealing being essentially the same in both cases.

It has been found in practice, however, that the high temperature at which the ware must be held for the maturing or fusing of the decoration, sometimes in the order of magnitude of 1100° to 1150° F. is so much higher than the equalization temperature at which it is necessary to hold the ware for the release of permanent strains therefrom at the start of the annealing process proper, that a material time has been wasted. A substantial space has been devoted to this portion of the ware treatment in continuous annealing lehrs, as shown in the Mulholland patent, so that the prior art lehrs had to be unduly long or the speed of movement of the ware through the lehr had to be quite slow. Either of these alternatives was slow and hence costly from the point of view of the manufacturer.

Among the objects of the present invention are to provide a method and an apparatus by which the difficulties hereinabove mentioned of prior art methods and of earlier apparatus are overcome.

A specific object of the present invention is to provide for the rapid reduction in temperature in the ware from the high temperature at which the decorating material is fused or matured thereon down to a temperature at which it is desired to hold the ware for equalizing the temperature throughout each article and from which temperature the annealing process proper may start. This equalizing or upper annealing temperature may be in the order of magnitude of 1000° F. for certain average types of glassware having ordinary and known glass composition. Of course, the equalizing temperature will vary to some extent depending primarily on the glass composition and to a lesser extent on the type of ware. In any event, by the rapid reduction of the temperature in the ware from the high temperature for maturing the decoration down to the considerably lower equalizing temperature, much time may be saved and the efficiency of the process and apparatus correspondingly enhanced.

Further objects of the invention include the provision of suitable means for applying the principles above set forth in muffle lehrs and particularly those lehrs having both bottom and top muffles and for providing for transverse uniformity of temperature, or in particular instances, a desired and controllable transverse non-uniformity of temperature to compensate for certain known conditions.

Other and more detailed objects of the present invention will become apparent from the following specification and appended claims when taken in connection with the accompanying drawings, in which:

Figs. 1 and 2 show more or less diagrammatically and in vertical longitudinal section a glassware decorating and annealing lehr embodying my invention, these figures when placed end to end in numerical order illustrating an entire lehr;

Fig. 3 is a fragmentary view partially in horizontal section and with other parts broken away to show subjacent structure in plan, illustrating a means for admitting independently controllable amounts of air to different flues beneath the tunnel;

Fig. 4 is a fragmentary view of the structure shown in Fig. 3 illustrating the air inlets to the lower flues, the view being taken substantially in vertical transverse section looking from the right toward the left in Fig. 3;

Fig. 5 is a fragmentary view in vertical longitudinal section illustrating an air inlet into one of the flues, an adjacent damper and a portion of the lower fire box:

Figs. 6 and 7 are fragmentary views substantially in vertical transverse section illustrating the dampers in the several bottom flues and their controls, the views being taken respectively on the lines 6—6 and 7—7 of Fig. 5;

Fig. 8 is a detail fragmentary view in vertical transverse section taken substantially on the line 8—8 of Fig. 1;

Fig. 9 is a detail fragmentary view in vertical transverse section taken substantially on the line 9—9 of Fig. 10 illustrating the manner of admitting diluting air into the top flues; and Fig. 10 is a fragmentary view principally in vertical longitudinal section showing the air inlet means for the top flues in Fig. 9 and a portion of the wall of the upper fire box.

Referring particularly to Figs. 1 and 2 of the drawings, there is shown a lehr tunnel 1, which may be constructed to a major extent at least of a plurality of interchangeable sections 2, arranged in end to end relation and suitably supported in any desired manner, as for example in the manner shown in the patent to Mulholland, No. 1,560,481, granted November 3, 1925.

The ware may be carried through the lehr in any suitable manner, as for example upon a flexible wire belt 3 of known construction, which may be driven by suitable mechanism (not shown), this mechanism preferably being of the type shown in the Mulholland patent, No. 1,560,-481, above referred to.

Heating flues generally indicated at 4 and 5 extend longitudinally beneath the forward and rear portions of the tunnel respectively, both communicating with a common fire box diagrammatically illustrated at 6, which is disposed beneath the lehr at a zone spaced from the entrance end of the tunnel. This zone will hereinafter be referred to as a second zone, the first zone being that extending between the entering end of the tunnel and the fire box 6. A damper 7 controls the passage of the heating media through the flues 4 from the fire box 6, while a plurality of dampers diagrammatically illustrated in Fig. 1 at 8, and more particularly illustrated in Figs. 5, 6 and 7 and hereinafter more fully described, control the passage of heating media through the flues 5, thus providing for the independent regulation of the drafts in these several flues.

The fire box 6 may be provided with one or more suitable burners (not shown) and adapted for any desired fluid fuel, which may be directed thereinto through suitable openings, one of which is indicated in dotted lines at 9. Air to support combustion may enter the fire box through the annular space between the burner and the sides of the opening 9. A desired amount of diluting air may also be admitted into the fire box 6 through a passage (not shown) for reducing the temperature of the products of combustion in the fire box to the desired point and preventing overheating of the lehr in the second zone thereof. The provision of diluting air openings of this kind is clearly illustrated in Figs. 2, 7 and 8 of Mulholland patent, No. 1,560,481 above referred to and, hence, it has not been thought necessary to illustrate it herein.

By suitable regulation of the burner or burners associated with the fire box 6 and the amount of air admitted to that fire box and by control of the dampers 7 and 8, the temperature and volume of the heated gases passing along the flues 4 and 5 respectively may be controlled. The regulation of temperatures in the flues 5 will be more particularly described hereinafter, especially as those parts of the flues 5 adjacent to the fire box.

It will be noted that the structure shown in the accompanying drawings differs from that of the earlier Hartford-Empire Co. decorating lehr shown in the Mulholland patent, No. 1,798,552, in that the fire box 6 is open for substantially its entire horizontal extent to the tunnel bottom to provide in this second zone a substantially constant high temperature above this fire box and to eliminate the possibility of there being a "hot spot" at any one point. In this way, it is possible to use a somewhat lower average temperature in the entire fire box while at the same time providing an adequate temperature and time for the maturing of the decoration. This also assists in prolonging the life of the apparatus as it prevents overheating of the structure, particularly of the metallic wall of the tunnel at one point or zone.

In Figs. 1 and 8, there is illustrated a relatively simple expedient for retarding the flow of hot gases through the center three flues of the five disclosed, while permitting substantially uninterrupted flow of the gases through the side flues. As shown, there is provided a transversely extending shaft 10 to which damper members 11 are secured, all substantially in the same plane. Thus, when the damper members 11 are closed, the middle three flues of the five provided will be substantially closed while flow through the side flues will be substantially uninterrupted.

It is well known that a considerable amount of heat is lost even through the heavy insulation indicated diagrammatically at 12, which surrounds the tunnel. This heat is lost more rapidly from the sides of the tunnel than from the center portion. If, then, we reduce the heat at the center portions of the bottom, the transverse temperature gradient in the tunnel tends to become more uniform. This is the object obtained by the provision of the dampers shown at 11. It will be understood, of course, that the several flues 4 are non-communicating intermediate their ends, although these flues all communicate with the interior of the fire box 6 and with a common outlet 13 controlled by the dampers 7 adjacent to the ware-entering end of the lehr.

It will further be noted that the gases flowing through these flues move in a direction countercurrent to the movement of the ware through the lehr, so as to provide a progressively increasing temperature gradient at the first zone of the lehr starting at the entering end.

The outlet passage 13 communicates with uptake passages 14, one on each side of the tunnel, and therethrough with a header 15, which in turn communicates through ducts 16 and 17 with a header 18, which communicates with a suitable exhaust means 19 here shown as a motor driven fan. The fan 19 discharges the gases through a passage 20 to a suitable stack (not shown). Any desired prime mover, such as an electric motor 21 may be provided for driving the fan 19.

In order to provide a desired annealing gradient in the annealing portion proper of the tunnel shown in Fig. 2 of the drawings, the flues 5 are provided at desired spaced intervals with suitable means for controlling the temperature drop in the gases passing therethrough. In the accompanying drawings, I have shown for this purpose air inlets 22, each controlled by an individual adjustable damper 23.

The principles of construction and operation in controlling the temperature gradient in the annealing portion of the tunnel by the aforesaid means are disclosed in Mulholland Patent No. 1,560,481 above referred to, and also in Mulholland reissue patent, Re. 17,263, granted April 9, 1929. Inasmuch as these principles form merely a background for the present invention and are fully explained in the aforesaid Mulholland patents, no further description thereof will be given.

The gases are exhausted from the flues 5 through a passage 24 controlled by a suitable damper 25 and thence pass through a lower header 26 and saddle pipes 27, one on each side of the lehr, to the wind box 18, above referred to, from which they are exhausted by the fan 19. The portion of the flues 5 to the right, as seen in Fig. 2, of the exhaust passage 24, may comprise a cooling flue and be provided with an air inlet opening 28 controlled by a suitable damper 29 as shown.

Above the tunnel and in the present instance directly opposite the fire box 6 is an upper fire box 30 which, as shown, may be similar to the fire box 6. One or more suitable burners (not shown) may be provided in association with the fire box 30 for directing fluid fuel thereinto to generate products of combustion therein. One of the burner openings for this fire box is illustrated in dotted lines at 31. This fire box may similarly be provided with diluting air inlet openings (not shown) as described for the lower fire box. It is noted that the upper fire box is exposed for substantially its entire horizontal extent to the roof of the tunnel so as to cooperate with the lower fire box in establishing a flat temperature curve in the second zone, which may be defined by the coextensive area of these fire boxes and the tunnel.

Associated with the fire box 30 and extending toward the entrance end of the tunnel therefrom are a plurality of flues 32, which may be similar in essential respects to the flues 4 with the exception that there are no dampers provided in the flues 32 as shown at 11 in the flues 4. Adjacent to the forward end of the flues 32 there may be provided one or more outlet passages 33 (two being shown in the present instance), each of which is controlled by a damper 34. These outlet passages communicate with the header 15 and that in turn through the ducts 16, 17, etc., with the fan 19.

Thus in the forward end zone or first zone of the tunnel, there is provided a temperature gradient which progressively increases along the path of the ware due to the countercurrent flow of controllable amounts of heated gases in heat transferring relation with the tunnel in this zone. The function of this zone is to bring the ware temperature from that at which the ware enters the tunnel substantially up to the desired high temperature for fusing the decorating material on the ware. The function of the second zone as above defined is to provide a maintained high temperature, which for certain decorating materials at least may be in the order of 1100 to 1150° F., for fusing or maturing the decorating material on the glassware. In certain special cases, glass temperatures as high as 1200° F. may be used.

Extending toward the rear of the tunnel from the fire box 30 above the path of the ware are a plurality, in this case five, of flues 35, these flues being provided in the annealing portion of the tunnel as shown in Fig. 2 with means for controlling the temperature drop of the gases passing therethrough. In this instance there are provided spaced air inlet openings 36, each of which is controlled by a manually operable damper 37. The flues 35 extend down the lehr to a suitable stop indicated at 38, Fig. 2. Adjacent to this stop the flues 35 are provided with one or more outlet openings 39 for the exhaust of the gases therefrom, these outlet openings being shown as two in number and being controlled by manually adjustable dampers 40. The outlet openings 39 communicate with a short exhaust duct 41, which in turn communicates with a header 42 which also serves to conduct gases from the duct 16 to the duct 17.

In prolongation of the flues 35, there may be provided a plurality of flues 43, which serve in the present instance as cooling flues. The flues 43 extend from the exit end of the tunnel to the stop 38 and are open at the exit end of the tunnel to the atmosphere as indicated at 44 for the inflow of air therefrom. The flue 43 may communicate at spaced intervals therealong with the duct 17 through spaced passages 45, each of these passages being controlled by a manually adjustable damper 46.

The upper temperature controlling system in so far as it has been described hereinabove may be considered substantially the equivalent of that shown in the Mulholland Patent, No. 1,798,552, and the portion thereof effective for the annealing, properly so called, of the glass, that is the portion shown in Fig. 2 of the accompanying drawings, may be similar in essential respects to flue systems used in the prior art for effecting annealing of glassware. In fact, the annealing proper of the glassware in so far as it is practiced according to the present teaching, follows standard prior art practices. Any satisfactory prior art practice may be employed in effecting the annealing of glass, including that particularly disclosed herein. The particular novel method step of the present invention takes place prior to the annealing proper of the ware and will be specifically described hereinafter.

It is desired according to my present invention, that there be means for accurately controlling the flow of hot gases along the flues 5, so as to provide for a desired transverse equality of temperature or a desired transverse inequality of temperature. One of the regulations which is particularly desired is a relative control of temperatures in the center flue or flues in respect to that in the side flue or flues. Another control desired is for one side in respect to the other. The reason for the former of these controls has been explained hereinabove in describing dampers 11 and their function. One reason for the latter is that it is occasionally desirable to compensate for an unequal condition due to the location of the lehr in order to provide transverse equality of temperature. Such a condition might arise for example in the case of a lehr disposed in an operating glass factory along the side of a glass making tank or furnace. Under these conditions any radiation from the tank or furnace would tend to retard the loss of heat through the adjacent side of the lehr, while the other side of the lehr might be exposed to radiation to the colder side walls of the building. Such a condition creates an inequality of temperature, especially during cold winter weather. Means for obtaining transverse inequality in the application of heat to such a lehr may be used to offset such condition and provide a transverse uniformity of temperature in the tunnel, even in the face of such unequal external conditions.

Another situation which is sometimes met with in practice is that a lehr may be operating in annealing two different types of ware, one a lighter type and the other a heavier type. One type of ware may be placed on one side of the longitudinal center of the lehr belt, while the other type is on the other side. Under these conditions, the heat content of the heavier type of ware is so much greater than that of the lighter type that it is necessary to apply heat non-uniformly transversely of the lehr in order to obtain desired annealing conditions for both types of ware. My present invention includes the provision of means permitting the proper regulation of lehr temperatures to compensate for this condition also.

Specifically, there are provided in the side flues 5, which will be numbered 47 and 48 for the purposes of this description, dampers 49 and 50 respectively (Figs. 3 and 7), which are mounted respectively upon actuating rods 51 and 52 arranged to be actuated by suitable manually operated means, such as levers or cranks (not shown). By the individual and independent adjustment of dampers 49 and 50, a transverse non-uniformity of the application of heat may be secured.

The center three flues of the flues 5, which are numbered 53, 54 and 55, are similarly provided with dampers 56, these dampers all being mounted on a shaft 57 extending through at least one side of the lehr and arranged to be operated by suitable operating means accessible to the operator. Inasmuch as the operating means for shaft 57 is independent of the means for operating shafts 51 and 52, there will be provided a relative adjustment between the gases flowing down the center flues and those flowing down the outside flues, and a corresponding independent temperature regulation of the center portion in respect to the side portions of the tunnel.

It is of course possible to provide independently controllable dampers for each of a plurality of flues, but usually a relative control between the two sides on the one hand and between the sides and the center on the other will be adequate to secure any desired operating conditions in most ordinary lehrs. I have chosen, therefore, merely to show this construction although I contemplate that my invention could be embodied in a device provided with independent dampers as suggested.

It will be understood that the dampers 49, 50 and 56 are the same dampers which are generally indicated in Fig. 1 at 8.

As above generally set forth, one of the faults in the prior art lehrs, including that forming the subject matter of Mulholland Patent, No. 1,798,552, was that after the glass was brought to the high temperature required for fusing the decoration, substantially 1100° F. to 1150° F. in many instances, the reduction in the glass temperature to the equalizing or high annealing temperature took place very slowly. Usually this reduction in temperature was at substantially the same rate as that through the critical annealing range, i. e., between the upper and lower annealing temperatures, which for some glasses may be the range from 1000° to 800° F. It is understood, of course, that slow cooling during this critical zone is important and must be carried on in order that the glass be properly annealed. On the other hand, the cooling through the upper range, i. e., down to the upper annealing temperature (about 1000° F.) need not be carried on slowly, but may be done quite rapidly if the apparatus is equipped to do it. No prior art lehr is so equipped to my knowledge. In this upper range, which may be, for example, from the high temperature aforesaid down to an equalizing or upper annealing temperature, which for many glasses is in the order of magnitude of 1000° F., the glass does not pass through any critical temperature and any changes which may take place in the glass during this transition in temperature may be equalized and their harmful effects removed by proper equalization of the temperature of the glass at around 1000° F. The annealing proper of the glass may then follow this equalization according to any desired method.

The present invention as above set forth provides a method of abstracting heat quite rapidly from the glass at this high temperature range and at a time in its decorating and annealing cycle immediately after it has passed through the second zone of the lehr as above defined, and provides apparatus for carrying out this method.

Specifically, this rapid heat abstraction may be accomplished by bringing into good heat transferring relation with the glass a current of a gaseous medium at a temperature substantially less than that of the glass. While I have shown in the present case the application of such a current of air as an admixture to the gases in the muffle, I contemplate that my invention may be embodied in a structure in which the cooling current may come into direct contact with the glass. All the appended claims not limited to preclude such an arrangement are to be construed broadly in this manner. Also the invention broadly may be applied to a lehr in which the temperature controlling media come into direct contact with the ware, as in a decorating lehr embodying features of my copending application, Serial No. 66,611, filed March 2, 1936.

The specific embodiment of the invention illustrated in the accompanying drawings, includes the provision of means for admitting cooling air from the atmosphere in controllable amounts to the flues 5 adjacent to the fire box 6. As shown, there is a passage indicated as a pipe 58 communicating with the flue 47 and provided with a suitable damper means 59 at its outer end at a point accessible to the lehr operator. A similar pipe 60 communicates with the other side flue 48 and is provided with a damper means 61 at its outer end. The center flues 53, 54 and 55 have but one pipe 62 communicating therewith, this pipe specifically communicating with the flue 54 and being provided at its outer end with a damper means 63. At the point where the several pipes 58, 60 and 62 communicate with their respectively associated flues 47, 48 and 54, there are provided shields as indicated at 64 in order that the air so admitted will not impinge against the bottom wall of the tunnel and form a cold spot prior to its being mixed in a fairly homogeneous manner with the gases in the respective flues. In order that the air admitted through pipe 62 will mix with the gases in all the flues 53, 54 and 55, these three flues communicate with one another through openings 65, Figs. 3 and 5. It is noted, however, that the flues 53, 54 and 55 do not communicate with flues 47 or 48 intermediate their ends.

I have found that by the use of the means above described, I am enabled to control the gases flowing along the several flues 5 independently as to both total volume and temperature and thus to control the heat mass of these gases even before the gases enter into the annealing portion proper of the device. The zone of the lehr immediately following the second zone, as above described, may be defined as a third zone. In this third zone the glassware may be brought down from its high temperature required for the fusing or maturing of the decoration (second zone) to an equalizing or upper annealing temperature, which is the temperature at which the glass is desired to be held for the release of any permanent strains which may have been created therein. Thereafter the glass may be annealed according to any well known or desired process or practice including that herein disclosed.

Associated with the upper flue, there may be a system of dampers and air inlet openings, the same as or similar to that just described for the lower flues 5. However, as the regulation of the temperature in the upper flues 35 is not as critical as that in the lower flues 5, I have shown a somewhat simpler means for effecting a temperature drop in these flues adjacent to the fire box 30. For this purpose, the center flue 66 (Fig. 9) of the series of parallel flues 35 has communicating therewith an air inlet passage 67, which is provided with a damper means 68 at its outer end accessible to the lehr operator. This center flue communicates with the flues on either side thereof through openings 69 (Figs. 9 and 10). There are, however, no air inlet openings provided for the side flues 70 and 71 of the upper series of flues 35, as normal cooling may be relied upon to accomplish the necessary temperature drop in those flues. This temperature drop may also, of course, be effected by removing some of the insulation along portions at least of the side flues.

What is desired and what is provided by the means described is a sharp drop in the temperature in the tunnel and, hence, that in the ware as it passes from the second zone opposite the fire boxes 6 and 30 into and through the first part of the succeeding or third zone so as to bring the temperature of the ware down to an equalizing temperature. Once the ware has been brought down to this temperature, it is very slowly cooled for a predetermined period, this period in the present instance being represented by the time necessary for the glass to pass up to the first of the air inlet openings to the upper and lower flues shown at the left in Fig. 2. During its passage through this portion of the lehr, the glass is equalized in temperature and is then ready for the normal annealing process, including the normal relatively slow, but somewhat faster reduction of the temperature through the critical annealing range followed by the more rapid cooling below that range down to a temperature desired for the glass at the time it emerges from the lehr tunnel. No particular description will be given of the annealing portion of the lehr shown in Fig. 2 of the accompanying drawings, as the operations in this portion of the device illustrated are substantially the same as those taking place in the portion of the lehr shown in the Mulholland patent, No. 1,798,552, and in effect are the equivalent of standard annealing processes now well known in the art.

While I have shown and described but one embodiment of my invention, it should be understood that many changes may be made therein and certain features thereof may have utility, independent of other features herein disclosed. I do not wish to be limited, therefore, except by the scope of the appended claims, which are to be construed as broadly as the state of the prior art permits.

I claim:
1. The method of decorating and subsequently annealing glassware, which comprises the steps of passing the ware after the decorating material has been applied thereto through an elongate tunnel including a plurality of zones, progressively increasing the temperature of the ware during its passage through a first of said zones to a temperature necessary to fuse the decorating material thereon, maintaining the temperature of the ware during its passage through a second of said zones for fusing the decorating material on the ware, rapidly causing a substantial temperature drop in the ware during its passage through a third of said zones for rapidly reducing the temperature of the ware to an equalizing temperature, maintaining the temperature of the ware within an equalizing temperature range during its passage through a fourth of said zones, and gradually reducing the temperature of the ware during its passage through the remainder of the tunnel for annealing the ware and reducing its temperature to a desired point.

2. The method of decorating and subsequently annealing glassware, which comprises the steps of passing the ware after decorating material has been applied thereto through an elongate tunnel including a plurality of zones, progressively increasing the temperature of the ware during its passage through a first of said zones to a temperature necessary to fuse the decorating material thereon, maintaining the temperature of the ware during its passage through a second of said zones for fusing the decorating material on the ware during its passage through said second zone, introducing a relatively cool gaseous media into heat transferring relation with the glassware during its passage through a third of said zones for rapidly reducing the temperature of the ware passing through said third zone and bringing this temperature to an equalizing temperature, maintaining the temperature of the ware within an equalizing temperature range during its passage through a fourth of said zones, and gradually decreasing the temperature of the ware during its passage through the remainder of the tunnel for annealing the ware and thereby reducing its temperature to a desired point.

3. Apparatus for decorating and annealing glassware, comprising an elongate tunnel including a plurality of zones, means for transporting glassware to which decorating material has been applied through said tunnel, means in the first of said zones of the tunnel starting at the entering end thereof for progressively increasing the temperature of the ware, means in the second of said zones for maintaining a high temperature in the ware to fuse the decorating material thereon during its passage through this zone, means associated with the third of said zones for rapidly cooling the ware passing therethrough from the temperature in said second zone to an equalizing temperature, said third zone being substantially shorter than said first zone, means associated with the fourth of said zones for maintaining the ware within an equalizing temperature range, and means associated with the remainder of said tunnel for annealing the ware and gradually cooling it to a desired temperature.

4. Apparatus for decorating and annealing glassware, comprising an elongate tunnel, means for transporting the ware therethrough, a muffle associated with a first zone of said tunnel starting at the entering end, means for causing hot gases to flow through said muffle in such manner as to establish a progressively increasing temperature gradient along the path of the ware passing through said first zone, a muffle associated with a second zone of said tunnel, means for generating heat within said muffle in the second zone to establish and maintain a high temperature in the tunnel in said second zone to fuse decorating material on the ware passing therethrough, a muffle associated with a third zone of said tunnel contiguous with said second zone, means for causing hot gases to flow through the last named muffle, means for sharply reducing the temperature of the gases in the last named muffle associated with said third zone to effect a substantial drop in the temperature gradient in the tunnel and to reduce the temperature of the ware from its high temperature in the second zone to an equalizing temperature, and muffle means associated with the remainder of said tunnel for establishing therein a temperature gradient for annealing the ware and cooling it to a desired temperature.

5. Apparatus for decorating and annealing glassware, comprising an elongate tunnel, means for transporting the ware therethrough, a muffle flue associated with and below the path of the ware in a first zone of said tunnel starting at the entering end, means for causing a countercurrent flow of a temperature controlling medium through said flue to provide a progressively increasing temperature gradient along the path of the ware in said first zone, a muffle chamber below and substantially coextensive with a second zone of said tunnel, means for generating heat in said muffle chamber to provide in said second zone a maintained high temperature to fuse the decorating material on the ware during its passage therethrough, a longitudinally extending muffle flue below the path of the ware in a major part at least of the remainder of said tunnel, means for supplying heated gases to the last named muffle flue and for causing such gases to flow therethrough in the same direction as that of the ware through the tunnel, means associated with the last named flue and adjacent to the termination of said second zone for diluting the gases in the last named flue with a relatively cooler gaseous media to establish in said tunnel a relatively short third zone contiguous with said second zone in which there is a substantial temperature drop in the ware from the temperature thereof in said second zone to an equalizing temperature, and means associated with the last named flue in the remainder of said tunnel for controlling the temperature of the gases passing therethrough and thereby for establishing in the remainder of said tunnel a desired temperature gradient for annealing the ware and controlling the cooling thereof to a desired temperature.

6. Apparatus for decorating and annealing glassware, comprising an elongate tunnel, means for transporting the ware therethrough, a longitudinally extending muffle flue associated with a first zone of said tunnel and disposed above the path of the ware therethrough, means for causing heated gases to pass through said flue in a direction opposite that of the movement of the ware through the tunnel to establish in the first zone of the tunnel a progressively increasing temperature gradient along the path of the ware, a muffle chamber above the path of the ware in a second zone of said tunnel and substantially coextensive with the top wall of the tunnel in said second zone, means for supplying heat to said chamber to establish in said second zone a maintained high temperature to fuse decorating material on the ware passing therethrough, a longitudinally extending muffle flue disposed above the path of the ware in a relatively short third zone of said tunnel contiguous with said second zone, means for causing heated gases to flow from said muffle chamber through the last named flue, means associated with the last named flue for causing a sharp temperature drop in the gases passing therethrough at a point in said third zone adjacent to said muffle chamber and thereby for causing a drop in the temperature gradient in the tunnel to reduce the temperature of the ware from its high temperature in the second zone to an equalizing temperature, and muffler means including a portion of the last named flue associated with the remainder of the tunnel for establishing therein a temperature gradient for annealing the ware and cooling it to a desired temperature.

7. Apparatus for decorating and annealing glassware, comprising an elongate tunnel, means for transporting ware therethrough, muffle means associated with a first zone of said tunnel starting at the entering end for establishing a progressively increasing temperature gradient in said zone along the path of the ware therethrough, muffle means associated with a second zone of said tunnel for establishing a maintained high temperature in said second zone to fuse the decorating material on the ware during its passage therethrough, a plurality of parallel longitudinal muffle flues arranged side by side transversely of the tunnel and associated with a part at least thereof rearwardly from said second zone, means for causing heated gases to flow through said parallel flues in the same direction as the movement of the ware therethrough, means associated with said parallel flues and arranged adjacent to the termination of said second zone for causing a substantial temperature drop in the gases passing therethrough by varying the volume of gases passing through said parallel flues, means associated with the last named means to effect a regulation of the temperature drop in the gases in said flues differentially between the center flues and side flues, and muffle means associated with the remainder of the tunnel for establishing a temperature gradient therein to anneal the ware.

8. Apparatus for decorating and annealing glassware, comprising an elongate tunnel, means for transporting ware therethrough, muffle means associated with a first zone of said tunnel starting at the entering end for establishing a progressively increasing temperature gradient in said zone along the path of the ware therethrough, muffle means associated with a second zone of said tunnel for establishing a maintained high temperature in said second zone to fuse the decorating material on the ware during its passage therethrough, a plurality of parallel longitudinal muffle flues arranged side by side transversely of the tunnel and associated with at least a part thereof rearwardly from said second zone, means for causing heated gases to flow through said parallel flues in the same direction as the movement of the ware, means associated with one of said parallel flues spaced from the sides of said tunnel toward the center thereof for introducing atmospheric air into such central flue to dilute the gases therein and cause a substantial drop in the temperature adjacent to the termination of said second zone and for thereby causing a temperature drop in the ware immediately after it passes from said second zone to reduce its temperature from the high temperature used for fusing the decorating thereon to an equalizing temperature, and means associated with said parallel flues at points spaced substantial distances from the termination of said second zone for controlling the temperatures of the gases passing therethrough and for thereby establishing in the latter portion of the tunnel a temperature gradient desired for annealing the ware.

9. Apparatus for decorating and annealing glassware, comprising an elongate tunnel, means for transporting ware therethrough, muffle means associated with a first zone of said tunnel starting at the entering end thereof for establishing a progressively increasing temperature gradient in said zone along the path of the ware therethrough, muffle means associated with a second zone of said tunnel for establishing and maintaining a high temperature in said sceond zone to fuse the decorating material on the ware during its passage therethrough, at least three parallel longitudinal muffle flues arranged side by side transversely of the tunnel and associated with a part at least thereof extending rearwardly from said second zone, said flues being independent of each other intermediate their ends, means for causing heated gases to flow through said parallel flues in the same direction as the movement of the ware, means associated with a center one of said parallel flues adjacent to the termination of said second zone for diluting the gases therein with a controllable amount of a relatively cooler gaseous media, other means associated with the side flues of said parallel flues for admitting independently controllable amounts of a relatively cooler gaseous medium to dilute the gases in said side flues adjacent to the termination of said second zone, the aforesaid means being constructed and arranged so as to establish a relatively sharp drop in the temperature in the ware passing through the tunnel shortly after it passes from said second zone to reduce its temperature to an equalizing temperature, and means associated with the remainder of the tunnel to control the annealing of the ware.

10. Apparatus for decorating and annealing glassware, comprising an elongate tunnel, means for transporting ware therethrough, muffle means associated with a first zone of said tunnel starting at the entering end for establishing a progressively increasing temperature gradient in said zone along the path of the ware therethrough, muffle means associated with a second zone of said tunnel for establishing and maintaining a high temperature in said second zone to fuse the decorating material on the ware during its passage therethrough, at least three parallel longitudinal flues arranged side by side transversely of the tunnel beneath the path of the ware therethrough and extending at least part way from the termination of said second zone toward the rear of said tunnel, means for causing heated gases to flow through said parallel flues in the same direction as the movement of the ware, means for independently controlling the volumes of heated gases passing through the side flues and the center flue, both one side in respect to the other and the sides in respect to the center, means associated with the side flues and the center flue respectively for admitting atmospheric air to said flues adjacent to the termination of said second zone, means for independently controlling the amounts of diluting air admitted to the side flues in respect to each other and to the center flue in respect to each of the side flues, and means associated with said parallel flues for establishing a desired temperature gradient in the gases therein at intervals along the remainder of said parallel flues and for thereby establishing in corresponding portions of said tunnel a desired temperature gradient to effect the annealing of the ware.

11. Apparatus for decorating and annealing glassware, comprising an elongate tunnel, means for transporting ware therethrough, longitudinally extending muffle heating flues associated with the floor and roof of said tunnel respectively in a first zone thereof for establishing a progressively increasing temperature gradient in the ware passing through said zone, means for causing a countercurrent flow of products of combustion through said flues, fire boxes associated with the floor and roof of said tunnel respectively in a second zone thereof and substantially coextensive with said second zone, means for generating products of combustion in said fire boxes, said fire boxes communicating with said flues in the first zone of the tunnel, at least three longitudinally extending muffle flues communicating with each of said fire boxes and extending toward the rear of the tunnel therefrom respectively above and below the path of the ware and independent of each other intermediate their ends, means for admitting independently controllable amounts of atmospheric air into the center flues of the last named parallel flues respectively above and below the tunnel and adjacent to their communication with said fire boxes respectively, other means for admitting independently controllable amounts of air to the side flues of said parallel flues below the tunnel adjacent to their communication with the fire box, dampers controlling the flow of products of combustion from the fire box below the tunnel and the center and side flues of said parallel flues below the tunnel, means for independently controlling the positions of said dampers, and means associated with all the flues extending from said fire boxes toward the rear of said tunnel at intervals therealong for admitting diluting air thereto from the atmosphere for establishing a temperature gradient in corresponding portions of the tunnel to anneal the glassware, whereby ware passing from the second zone of the tunnel at the high temperature of the second zone will be rapidly brought down to an equalizing temperature prior to being annealed.

DONALD G. MERRILL.